(12) United States Patent
Quick et al.

(10) Patent No.: US 9,834,260 B2
(45) Date of Patent: Dec. 5, 2017

(54) TRUCK BED EXTENSION APPARATUS

(71) Applicant: Quick Extend-A-Bed, LLC, Newport Beach, CA (US)

(72) Inventors: Larry A. Quick, Anaheim, CA (US); Richard James Waitneight, Newport Beach, CA (US)

(73) Assignee: Quick Extend-A-Bed, LLC, Newport Beach, CA (US)

( * ) Notice: Subject to any disclaimer, the term of this patent is extended or adjusted under 35 U.S.C. 154(b) by 0 days.

(21) Appl. No.: 15/277,273

(22) Filed: Sep. 27, 2016

(65) Prior Publication Data

US 2017/0203799 A1 Jul. 20, 2017

Related U.S. Application Data

(63) Continuation-in-part of application No. 14/956,692, filed on Dec. 2, 2015, now Pat. No. 9,452,793.

(60) Provisional application No. 62/246,740, filed on Oct. 27, 2015.

(51) Int. Cl.
*B62D 33/03* (2006.01)
*B62D 33/027* (2006.01)

(52) U.S. Cl.
CPC ......... *B62D 33/03* (2013.01); *B62D 33/0273* (2013.01)

(58) Field of Classification Search
CPC ... B62D 33/0273; B62D 33/03; Y10T 16/551; Y10T 16/5515; Y10T 16/5518
USPC ................. 296/26.11, 26.15, 57.1
See application file for complete search history.

(56) References Cited

U.S. PATENT DOCUMENTS

| | | | |
|---|---|---|---|
| 976,392 A | * | 11/1910 | Paynter .................. E05D 7/081 |
| | | | 16/317 |
| 4,472,639 A | | 9/1984 | Bianchi |
| 4,531,773 A | | 7/1985 | Smith |
| 5,287,596 A | * | 2/1994 | Chen ...................... E05D 11/06 |
| | | | 16/331 |

(Continued)

FOREIGN PATENT DOCUMENTS

| | | |
|---|---|---|
| CA | 1 244 858 | 11/1988 |
| CA | 2 924 242 | 10/2015 |

(Continued)

OTHER PUBLICATIONS

International Search Report dated Feb. 3, 2017 in corresponding PCT Application No. PCT/US2016/057510, 3 pgs.

(Continued)

*Primary Examiner* — Jason S Morrow
(74) *Attorney, Agent, or Firm* — Knobbe, Martens, Olson & Bear, LLP

(57) ABSTRACT

A truck bed extension apparatus can include a hinge assembly having a hinge plate configured to be coupled to a primary tailgate of a pickup. An auxiliary tailgate includes a lower edge pivotally coupled to a front edge of the hinge plate, the auxiliary tailgate being pivotally movable between a stowed configuration co-planar with and adjacent to the hinge plate and a deployed configuration extending upwardly from the hinge plate. A pair of side panels is pivotally coupled to opposed side edges of the auxiliary tailgate and selectively movable between retracted and extended configurations. The hinge assembly can include a limiter configured to limit movement of the hinge assembly to prevent sagging of the auxiliary tailgate when in a stowed configuration.

19 Claims, 19 Drawing Sheets

(56) References Cited

U.S. PATENT DOCUMENTS

| | | |
|---|---|---|
| 5,468,038 A | 11/1995 | Sauri |
| 5,765,892 A | 6/1998 | Covington |
| 5,775,759 A | 7/1998 | Cummins |
| 5,788,311 A | 8/1998 | Tibbals |
| 6,158,797 A | 12/2000 | Bauer |
| 6,193,294 B1 | 2/2001 | Disner et al. |
| 6,279,980 B1 | 8/2001 | Straschewski |
| 6,353,967 B1* | 3/2002 | Escobar ............... E05D 3/02 16/331 |
| 6,364,392 B1 | 4/2002 | Meinke |
| 6,378,926 B1 | 4/2002 | Renze et al. |
| 6,422,342 B1 | 7/2002 | Armstrong et al. |
| 6,454,338 B1 | 9/2002 | Glickman et al. |
| 6,550,841 B1 | 4/2003 | Burdon et al. |
| 6,626,478 B1 | 9/2003 | Minton |
| D485,800 S | 1/2004 | Smith Dean P |
| 6,957,840 B1 | 10/2005 | Endres |
| 7,261,357 B1 | 8/2007 | Bechen |
| 7,264,292 B1 | 9/2007 | Summers |
| 8,109,552 B2 | 2/2012 | Nelson |
| 8,182,012 B1 | 5/2012 | Brister |
| 9,452,793 B1 | 9/2016 | Quick |
| 2002/0121794 A1* | 9/2002 | Vejnar ............... B62D 33/0273 296/50 |
| 2004/0174032 A1 | 9/2004 | Vejnar |
| 2006/0033352 A1 | 2/2006 | King et al. |
| 2006/0214449 A1 | 9/2006 | Klusmeier |
| 2008/0231067 A1 | 9/2008 | Nagle |
| 2009/0309381 A1 | 12/2009 | Nelson |
| 2012/0023706 A1* | 2/2012 | Fuller ............... E05D 11/06 16/374 |
| 2013/0049395 A1 | 2/2013 | Poirier |
| 2014/0333083 A1 | 11/2014 | Bzoza |

FOREIGN PATENT DOCUMENTS

| | | |
|---|---|---|
| GB | 2 199 365 A1 | 7/1988 |
| GB | 2 467 319 A1 | 8/2010 |

OTHER PUBLICATIONS

"Fold Down Truck Bed Extender-Anodized Silver Topline Bed Extender BX4004-01", www.etrailer.com, Retrieved Jun. 14, 2016.

* cited by examiner

TRUCK BED EXTENSION APPARATUS

REFERENCE TO RELATED APPLICATIONS

This application is a Continuation-In-Part of U.S. Pat. No. 9,452,793, filed Dec. 2, 2015, which claims the benefit of provisional patent application U.S. Ser. No. 62/246,740 filed Oct. 27, 2015 titled Quick Extend-A-Bed and which is incorporated herein by reference.

BACKGROUND OF THE INVENTION

This invention relates generally to truck tailgate accessories and, more particularly, to a truck bed extension apparatus for selectively increasing the length of a truck bed and enclosing the lengthened truck bed area.

Therefore, it would be desirable to have a truck bed extension apparatus that lengthens and encloses the lengthened truck bed. Further, it would be desirable to have a truck bed extension apparatus that is pivotally movable between a stowed configuration substantially co-planar with an inner surface of the truck's tailgate to a deployed configuration extending upwardly from an opened truck tailgate and to a released configuration extending downwardly from the opened truck tailgate.

SUMMARY OF THE INVENTION

A truck bed extension apparatus according to some embodiments, for use in extending a usable area of a truck having a pickup box and truck bed that defines an open end and that includes a primary tailgate pivotally movable between a closed configuration covering the open end and an open configuration not covering the open end, the extension apparatus having a hinge assembly that includes a hinge plate coupled to the primary tailgate, the hinge plate having a front edge adjacent a free edge of the primary tailgate. An auxiliary tailgate includes a lower edge pivotally coupled to the front edge of the hinge plate, the auxiliary tailgate being pivotally movable between a stowed configuration generally co-planar with and adjacent to the hinge plate and a deployed configuration extending upwardly from and perpendicular to the hinge plate.

A pair of side panels are pivotally coupled to side edges of the auxiliary tailgate, respectively, each side panel being selectively movable between a retracted configuration generally co-planar with and bearing against an inside surface of the auxiliary tailgate and an extended configuration generally perpendicular to the inside surface of the auxiliary tailgate. The truck bed is extended and enclosed when the primary tailgate is at the open configuration, the auxiliary tailgate is at the deployed configuration, and the pair of side panels is at the extended configuration.

Thus, some embodiments disclosed herein can provide a truck bed extension apparatus for selectively increasing the length of a pickup truck bed.

Additionally, some embodiments disclosed herein can provide a truck bed extension apparatus, as aforesaid, having an auxiliary tailgate that may be stowed away on an inner surface of the truck's primary tailgate or deployed upwardly when the primary tailgate is opened.

Further, some embodiments disclosed herein can provide a truck bed extension apparatus, as aforesaid, in which the lengthened truck bed may be enclosed by the auxiliary tailgate and foldout side panels.

Another aspect of at least one of the inventions disclosed herein includes the realization that an auxiliary tailgate that folds against the primary tailgate about a hinge can suffer from fitment problems caused by sagging of the assembly when folded. For example, when such an auxiliary tailgate is folded into the stowed position and the primary tailgate of the associated vehicle is closed (i.e., oriented generally vertically), the weight of the auxiliary tailgate pulls downwardly on the hinge assembly and can thus sag downwardly. If the auxiliary tailgate sags to a position that is excessively low along the inner surface of the primary tailgate, the auxiliary tailgate can be pinched as a user attempts to close the primary tailgate, i.e., pinched between the end of the primary tailgate and the truck bed. Thus, an auxiliary tailgate assembly that sags should be mounted higher on the primary tailgate and/or should be sized to a shorter dimension such that it does not become pinched between the primary tailgate and the truck bed. Such sizing and/or positioning, however, limits the overall height of the auxiliary tailgate when in a deployed position, and thus can create undesirable effects on aerodynamics and cargo capacity.

Thus, in accordance with at least some of the embodiments disclosed herein, a truck bed extension assembly can include an auxiliary tailgate member having a base edge pivotally attached to a top edge of a primary tailgate with a hinge. The hinge can include physical stops limiting movement of the hinge, in the closing direction, to the predetermined angle, for example, approximately 90 degrees. As such, when the auxiliary tailgate is folded against the primary tailgate, the physical stops on the hinge can prevent sagging of the auxiliary tailgate.

Other objects and advantages of the inventions disclosed herein are apparent from the following description taken in connection with the accompanying drawings, wherein is set forth by way of illustration and example, embodiments of this invention.

DETAILED DESCRIPTION OF THE PREFERRED EMBODIMENT

Figure 1:
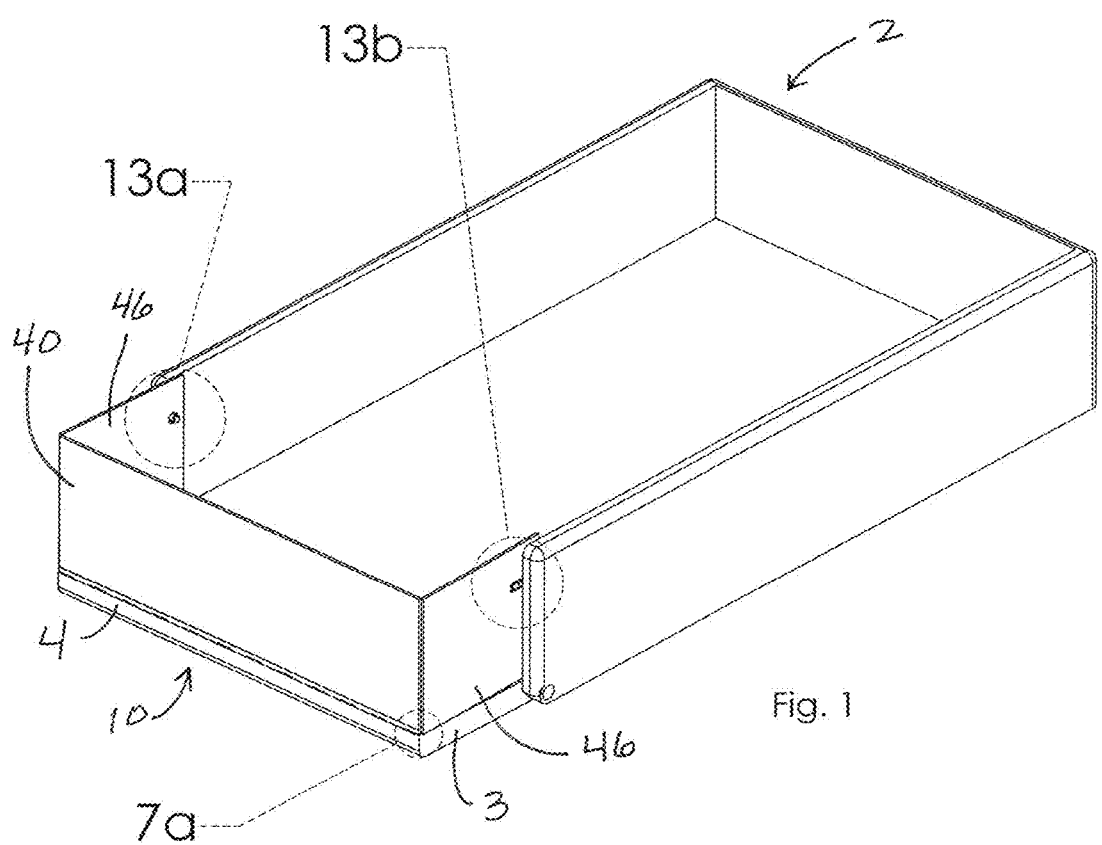
FIG. 1 is a perspective view of a truck bed extension apparatus according to a preferred embodiment of the present invention illustrating the apparatus in an extended and enclosed configuration.

A truck bed extension apparatus according to a preferred embodiment will now be described in detail with reference to FIGS. 1 to 14 of the accompanying drawings. The truck bed extension apparatus 10 includes an auxiliary tailgate 40, a pair of side panels 46, and a hinge assembly 20 for use with a truck bed 2, also referred to as a pickup box, having a primary tailgate 3.

The primary tailgate 3 of a pickup truck is pivotally movable between a closed configuration (FIG. 5) that blocks access to the interior of the pickup box 2 via its open rear end and an open configuration (FIGS. 2 to 4) that allows access to the interior, a.k.a. truck bed, via its open rear end. The primary tailgate 3 has a free edge 4 and may include a handle 5 configured to release the primary tailgate 3 to move between closed and open configurations. A conventional pickup box 2 may include fasteners adjacent the open rear end that are useful in fastening a portion of the present invention to the pickup box 2 as will be described later.

Figure 7A:
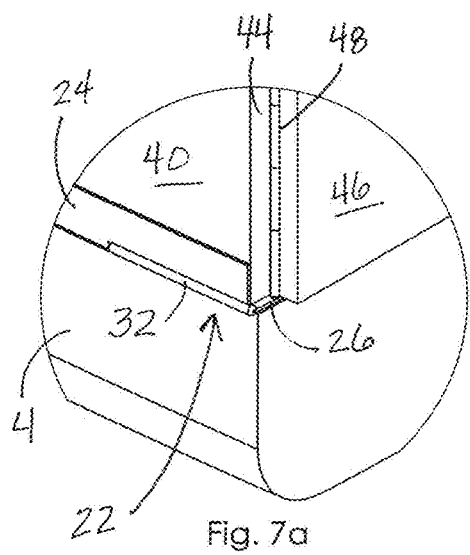
FIG. 7a is an isolated view on an enlarged scale taken from FIG. 1.
Figure 7B:
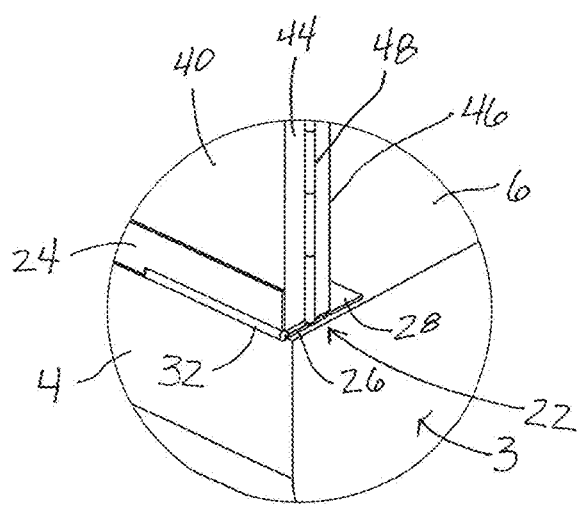
FIG. 7b is an isolated view on an enlarged scale taken from FIG. 2.
Figure 7C:
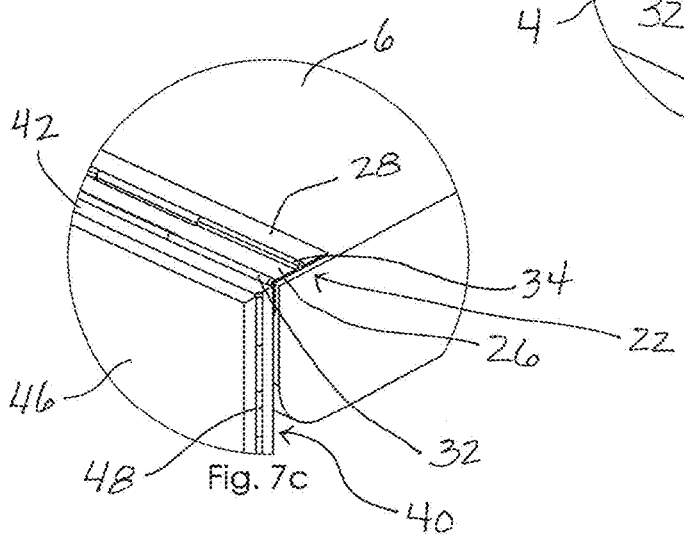
FIG. 7c is an isolated view on an enlarged scale taken from FIG. 3.

The hinge assembly 20 of the truck bed extension apparatus 10 is coupled to the primary tailgate 3 of a truck and provides the means for mounting the additional components to the primary tailgate 3. More particularly, the hinge assembly 20 includes a hinge plate 22 having a front portion 24 that is, at deployed and released configuration, situated adjacent the free edge 4 of the primary tailgate 3 of a pickup truck. In fact, the front portion 24 may be coupled to the auxiliary tailgate 40, such as with bolts (not shown). Preferably, the hinge assembly 20 includes a double hinge member 30 having a first hinge 32 and a second hinge 34 rearwardly displaced from and parallel to the first hinge 32 (FIG. 7c). The hinge plate 22 includes a first plate section 26 extending between the first hinge 32 and the second hinge 34 and a second plate section 28 extending rearwardly (away from) the second hinge 34 (FIG. 7b). The second plate section 28 may be fixedly attached to the inner surface 6 of the primary tailgate 3, such as with bolts (not shown), while the first plate section 26 movable relative to the inner surface 6 of the primary tailgate 3 as will be described in more detail below.

Figure 2:
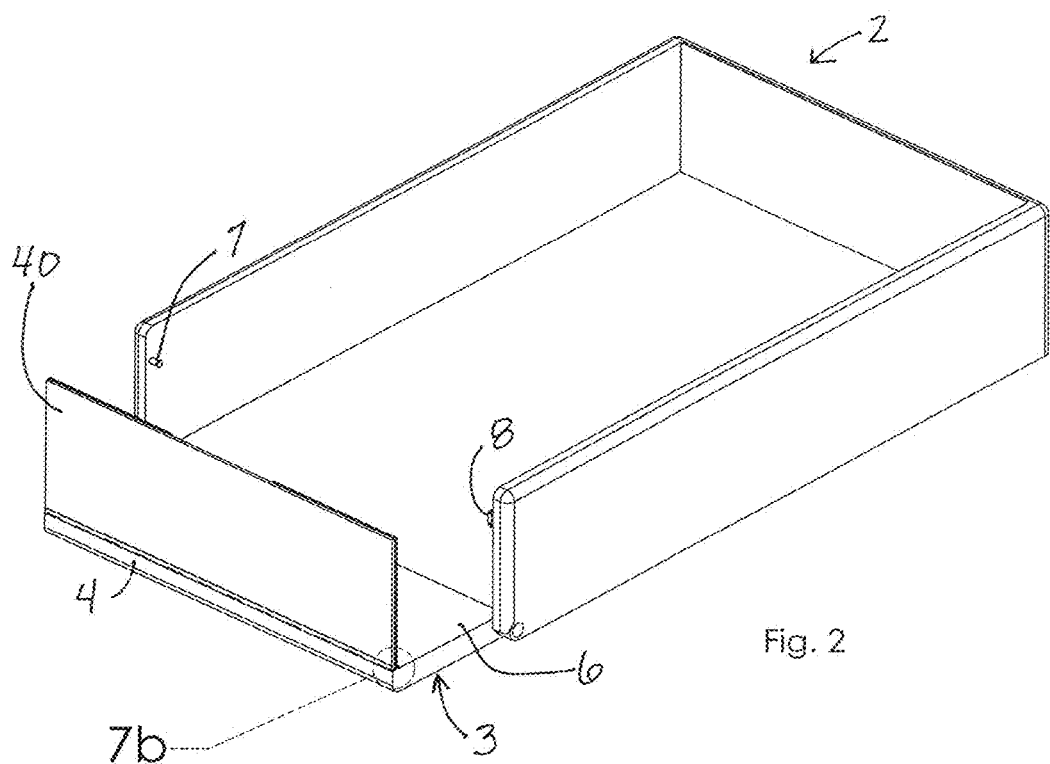
FIG. 2 is another perspective view of the extension apparatus as in FIG. 1, illustrating the apparatus in an extended but not enclosed configuration.

The auxiliary tailgate 40 may have a generally rectangular configuration having a lower edge 42 (or "base edge") and opposed side edges 44. The auxiliary tailgate 40 may have dimensions that are substantially similar to the dimensions of the primary tailgate 3. The lower edge 42 of the auxiliary tailgate 40 may be operably coupled to the hinge assembly 20 and pivotally movable between a stowed configuration that is generally co-planar with and adjacent to the inner surface 6 of the primary tailgate 3 (FIG. 4) and a deployed configuration generally perpendicular to and extending upwardly from the inner surface 6 of the primary tailgate 3 (FIG. 2). Clearly, when the primary tailgate 3 is at its open configuration and the auxiliary tailgate 40 is at the deployed configuration, access to the interior of the pickup box 2 is blocked.

Figure 3:
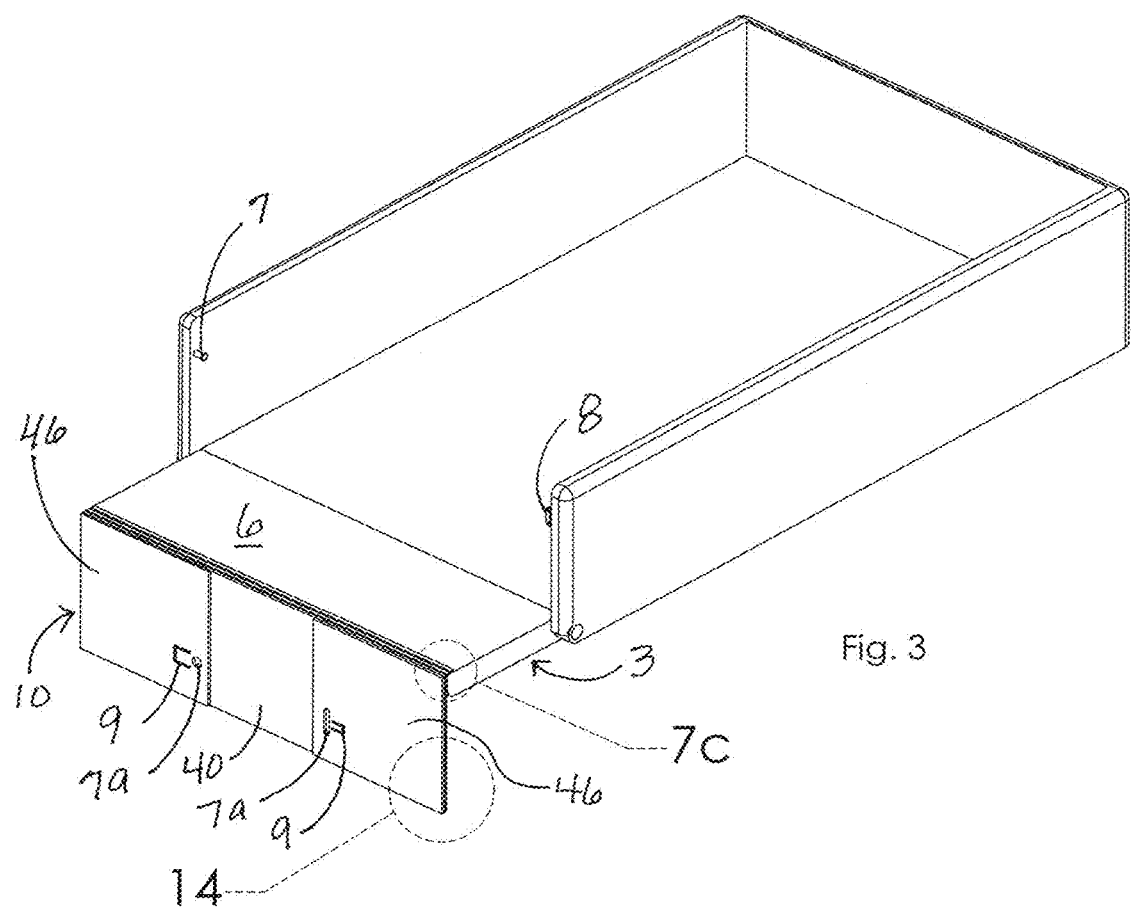
FIG. 3 is another perspective view of the extension apparatus as in FIG. 1, illustrating the auxiliary tailgate in a released configuration.
Figure 4:
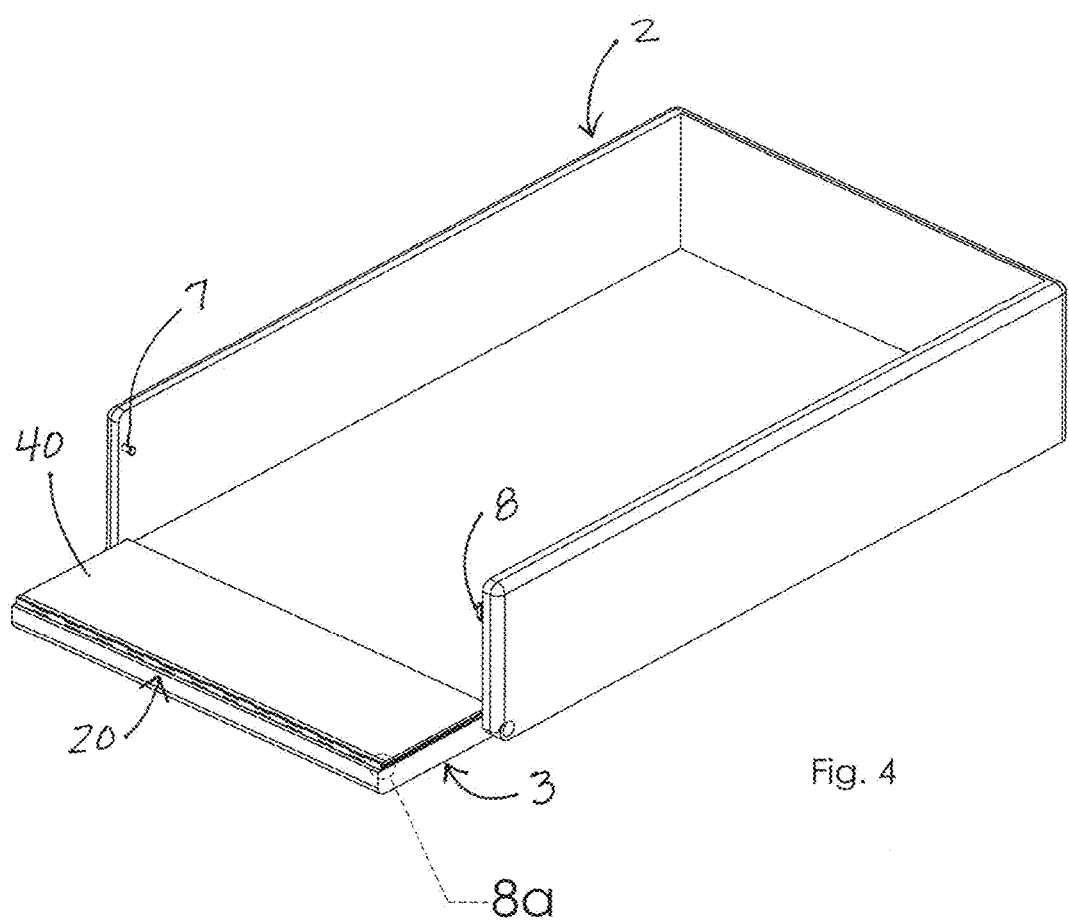
FIG. 4 is another perspective view of the extension apparatus as in FIG. 1, illustrating the auxiliary tailgate in a stowed configuration.
Figure 5:
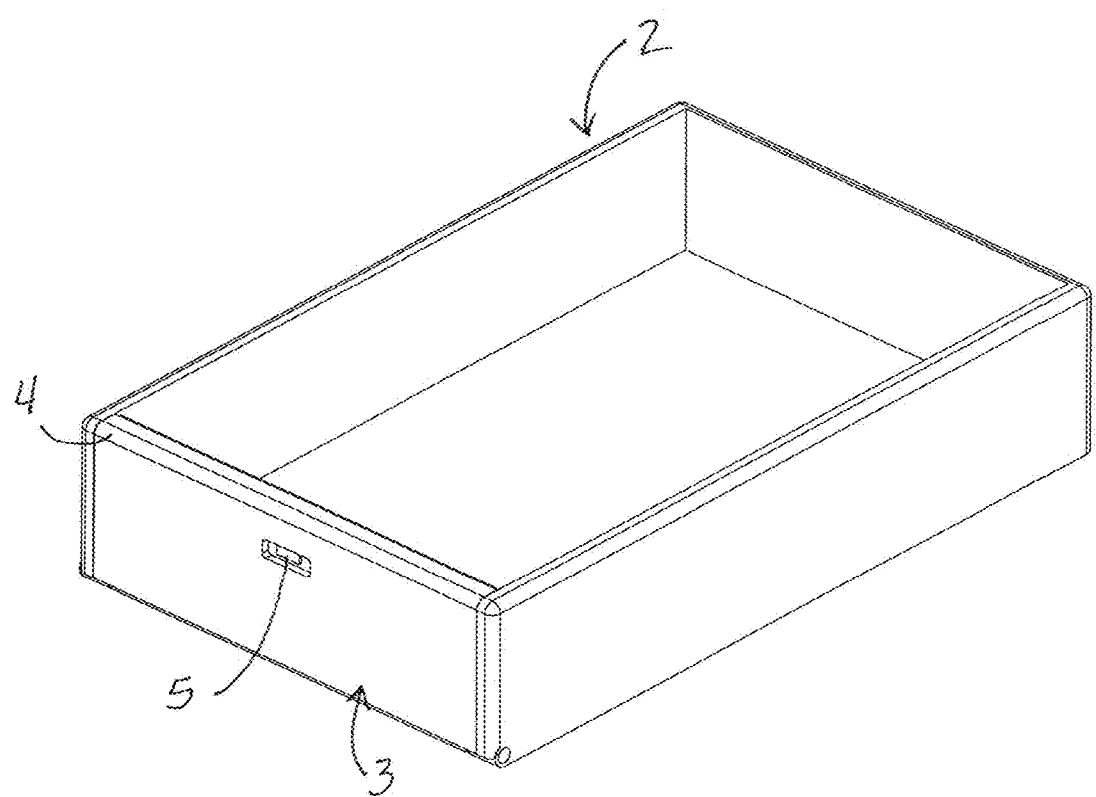
FIG. 5 is another perspective view of the extension apparatus as in FIG. 1, illustrating the primary tailgate in a closed configuration.
Figure 6:
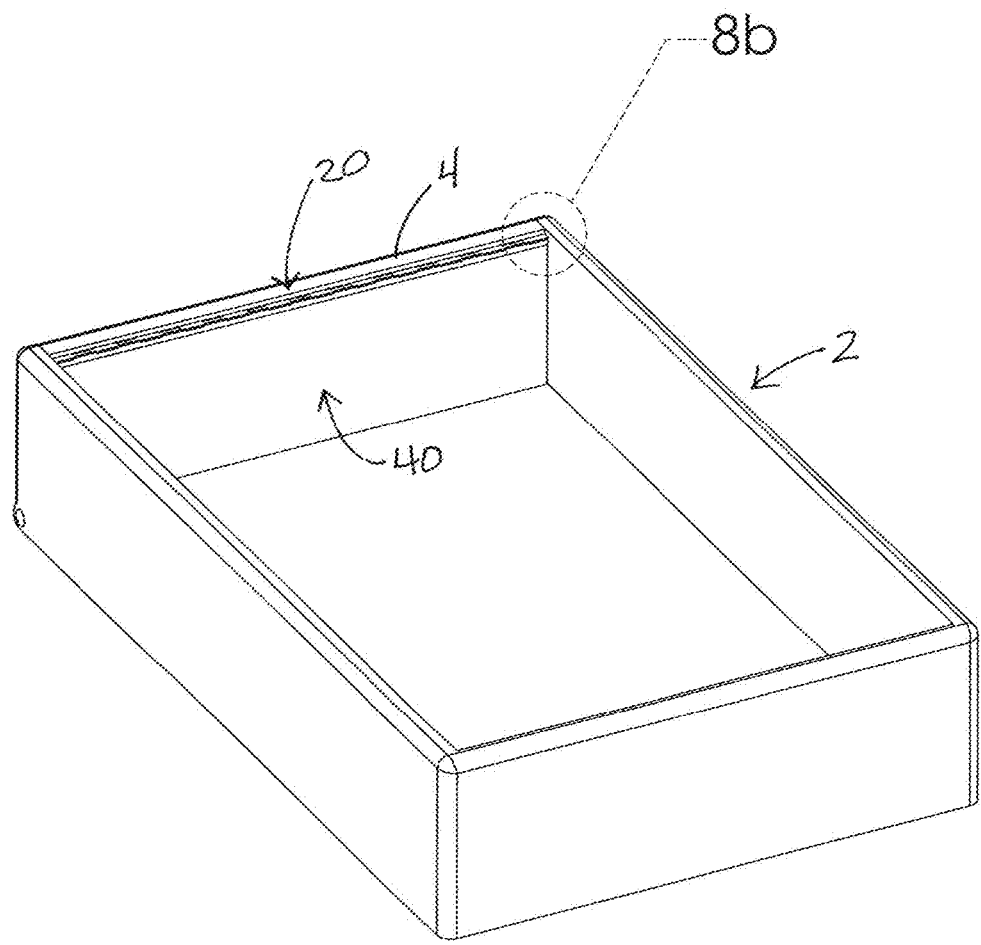
FIG. 6 is a perspective view from reverse angle of the extension apparatus as in FIG. 5.

The auxiliary tailgate 40 is pivotally movable by operation of the hinge assembly 20. More particularly, the auxiliary tailgate 40 is pivotally movable to a released configuration generally perpendicular to and extending downwardly from the front portion 24 of the hinge plate 22 and free edge 4 of the primary tailgate 3 (FIG. 3). When the primary tailgate 3 is at its open configuration and the auxiliary tailgate 40 is at the released configuration, access to the interior of the pickup box 2 is not blocked. Movement of the auxiliary tailgate 40 between the deployed configuration and released configuration is by operation (pivotal rotation) of the first hinge 32.

It will be understood that the double hinge assembly 20 enables about 270 degrees of rotation upon operation of the first hinge 32 and second hinge 34, respectively. Specifically, the auxiliary tailgate 40 is rotated about 90 degrees from the stowed configuration (FIG. 4) to the deployed configuration (FIG. 2). Similarly, the auxiliary tailgate 40 is rotated about 180 degrees from the deployed configuration (FIG. 2) to the released configuration (FIG. 3).

In an embodiment, selective operation of the first hinge 32, second hinge 34, and hinge plate 22 are required to move the auxiliary tailgate 40 from the stowed configuration to the deployed configuration to the released configuration and back again. As shown in FIG. 7b (illustrating the deployed configuration) and FIG. 7c (illustrating the released configuration), the hinge plate 22 of the double hinge member 30 lies flat atop the inner surface 6 of the primary tailgate 3. In addition, a front portion 24 of the hinge plate 22 and first hinge 32 are adjacent the free edge 4 of the primary tailgate 3. Movement of the auxiliary tailgate 40 between the deployed and released configurations is by a 180 degree rotational movement of the first hinge 32, the lower edge 42 of the auxiliary tailgate 40 being coupled to the first hinge 32.

Figure 8A:
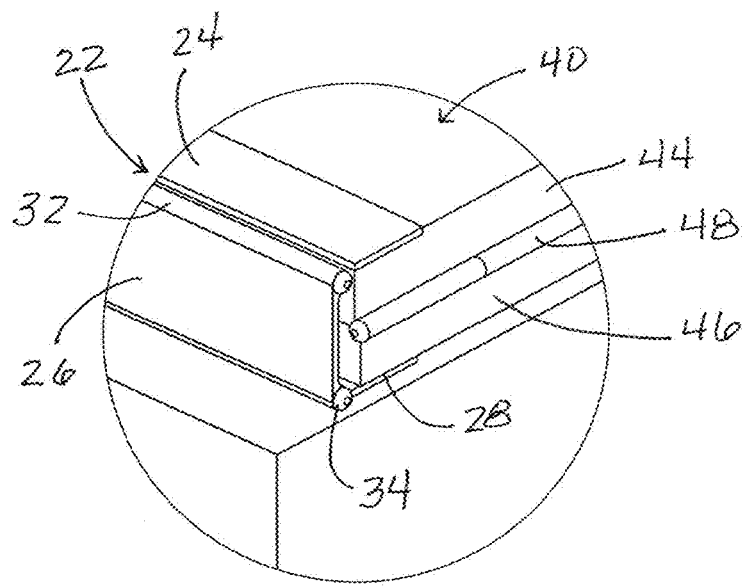
FIG. 8a is an isolated view on an enlarged scale taken from FIG. 4.
Figure 8B:
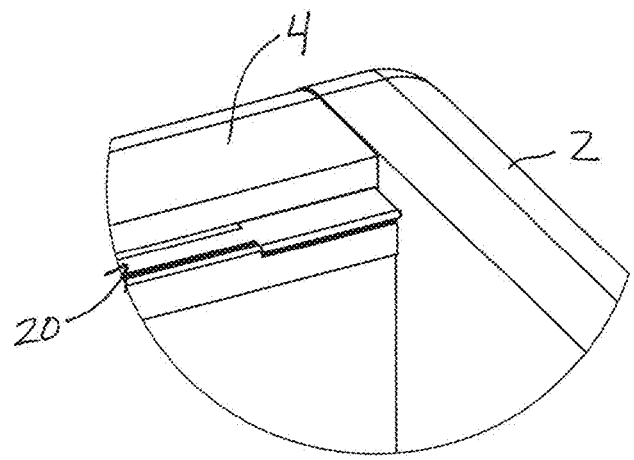
FIG. 8b is an isolated view on an enlarged scale taken from FIG. 6.
Figure 9:
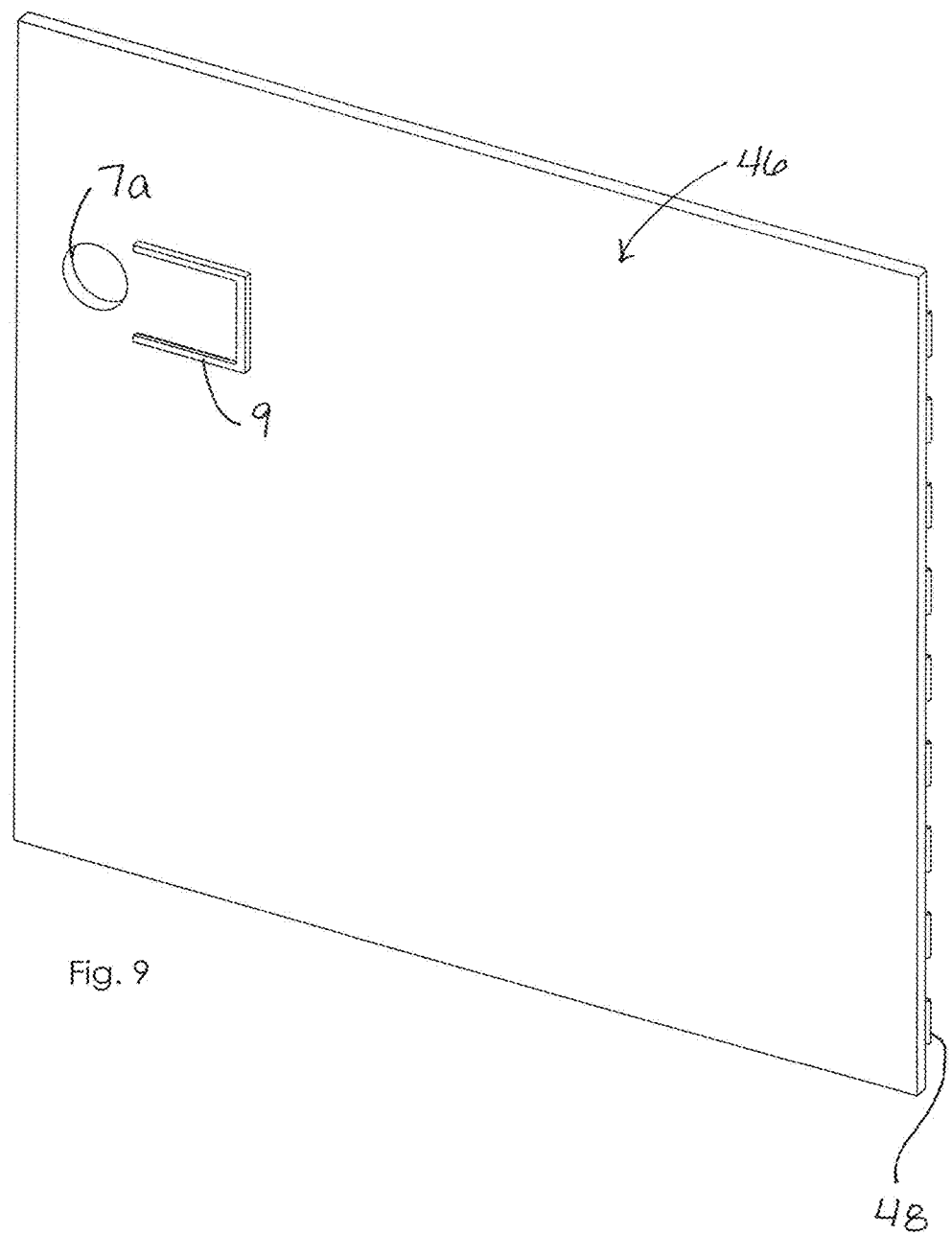
FIG. 9 is an isolated perspective view of one side panel taken from FIG. 1.
Figure 10:
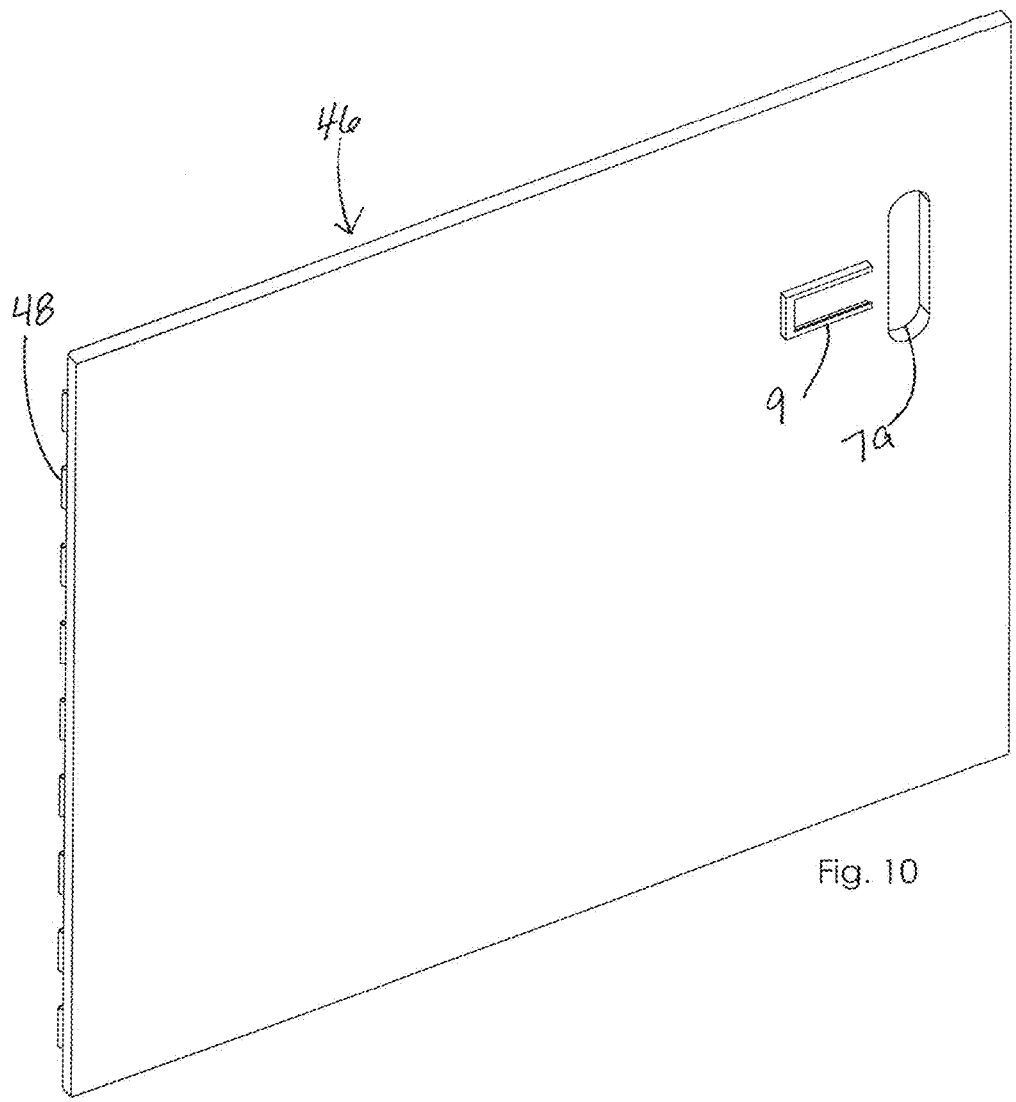
FIG. 10 is an isolated perspective view of another side panel taken from FIG. 1.
Figure 11:
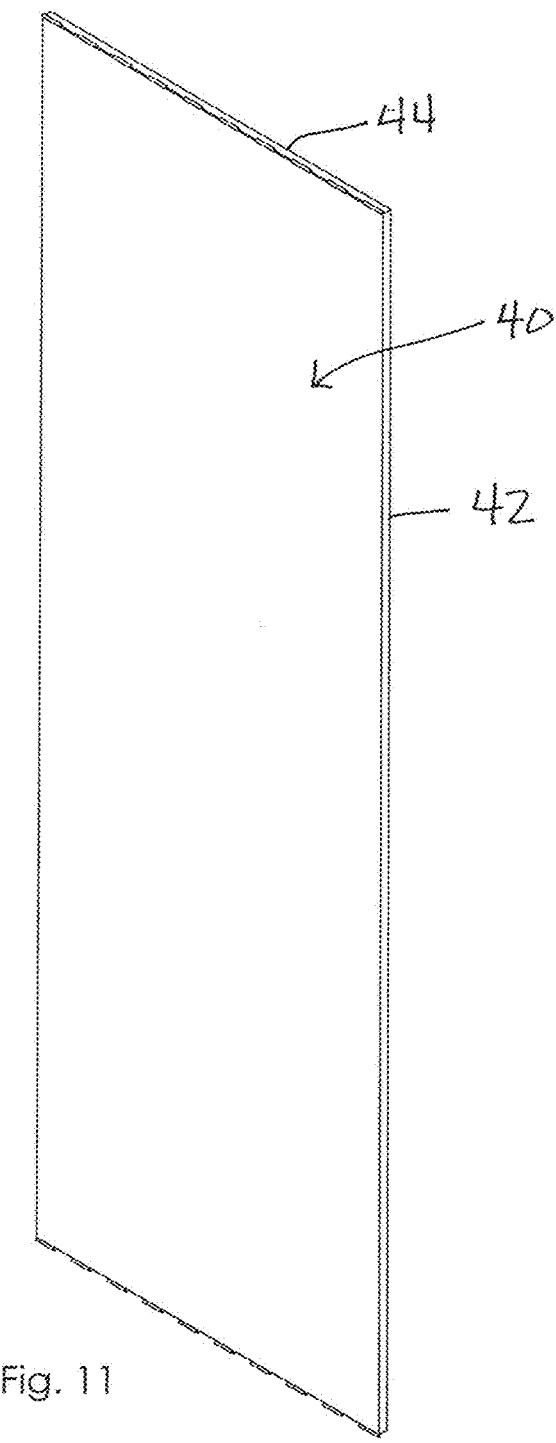
FIG. 11 is an isolated perspective view of the auxiliary tailgate taken from FIG. 1.
Figure 12A:
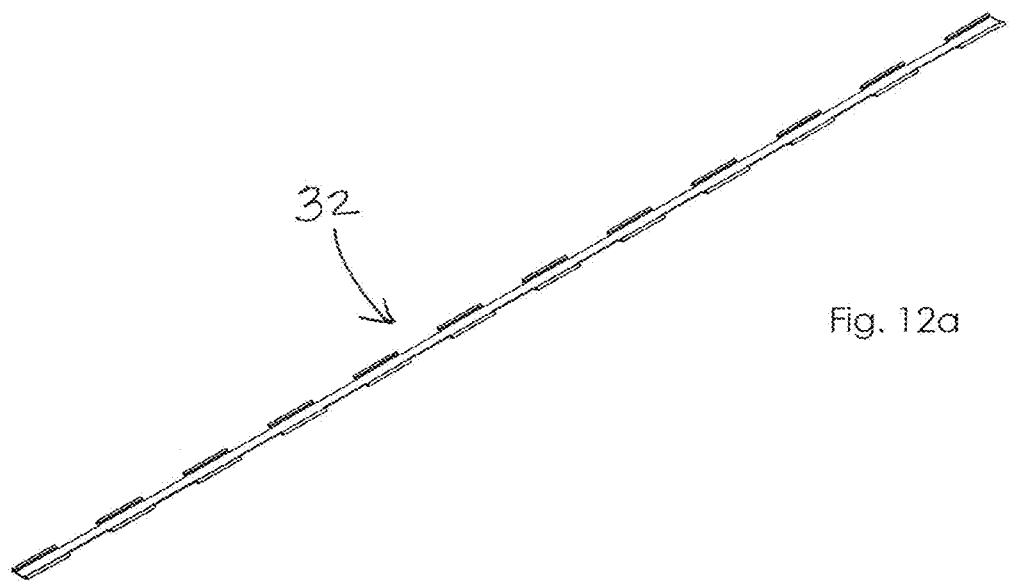
FIG. 12a is an isolated view of a first hinge.
Figure 12B:
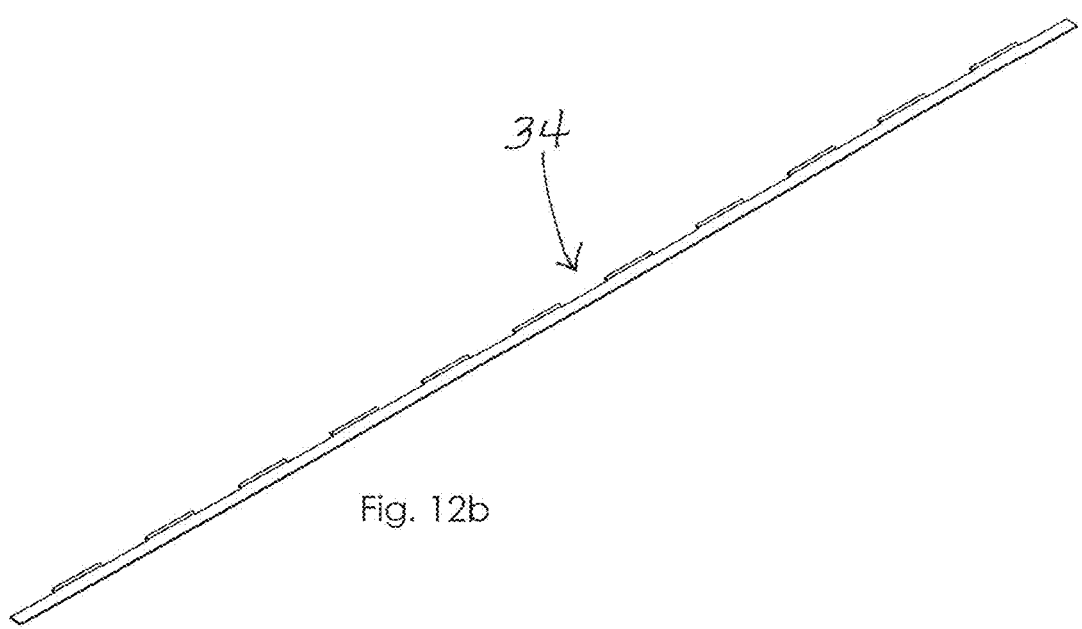
FIG. 12b is an isolated view of a second hinge.

Movement of the auxiliary tailgate 40 to the stowed configuration (FIG. 4), however, involves rotation of the second hinge 34. More particularly, the first hinge plate 22 is displaced from the inner surface 6 of the primary tailgate 3 and is rotated by the second hinge 34 until it becomes situated substantially vertical and perpendicular relative to the second plate section 28 (FIG. 8a). At this configuration (stowed), the first hinge 32 and second hinge 34, while still displaced, are situated in a common vertical plane (FIG. 8a). As a result, the auxiliary tailgate 40 is essentially positioned atop or adjacent the inner surface 6 of the primary tailgate 3. At the stowed configuration, the primary tailgate 3 may be pivotally moved to the closed configuration in a conventional manner without any interference by the auxiliary tailgate 40 (FIG. 8b).

In another aspect, the truck bed extension apparatus 10 includes a pair of side panels 46 pivotally coupled to opposed side edges 44 of the auxiliary tailgate 40, respectively. Each side panel 46 may be pivotally attached with hinges 48 and is selectively movable between a between a retracted configuration that is generally co-planar with or bearing against an inside surface of the auxiliary tailgate 40 (FIG. 3) and an extended configuration generally perpendicular to the inside surface of the auxiliary tailgate 40 (FIG. 1). In other words, the side panels 46 may be selectively rotated to closed positions, such as when the auxiliary tailgate 40 is being moved to the stowed configuration. However, the side panels 46, when moved to the extended configurations, provide extensions of the pickup box side walls. To be clear, the "extended truck bed" is extended and enclosed when the primary tailgate 3 is at the opened configuration, the auxiliary tailgate 40 is at the deployed configuration, and the pair of side panels 46 is at the extended configuration (FIG. 1).

Figure 13A:
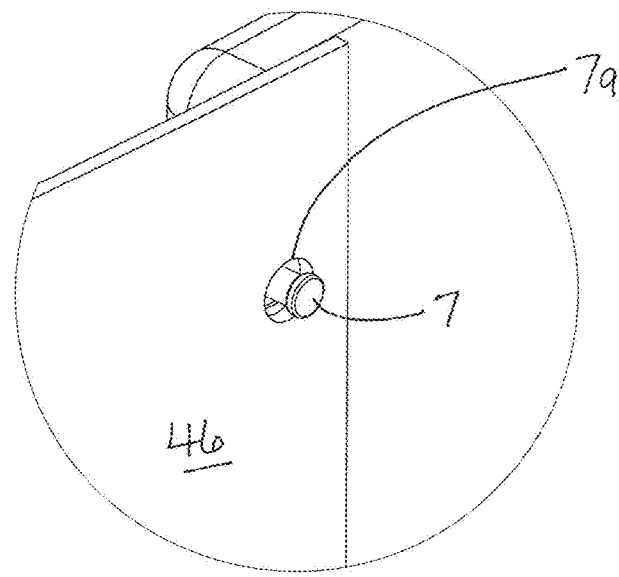
FIG. 13a is an isolated view on an enlarged scale taken from FIG. 1.
Figure 13B:
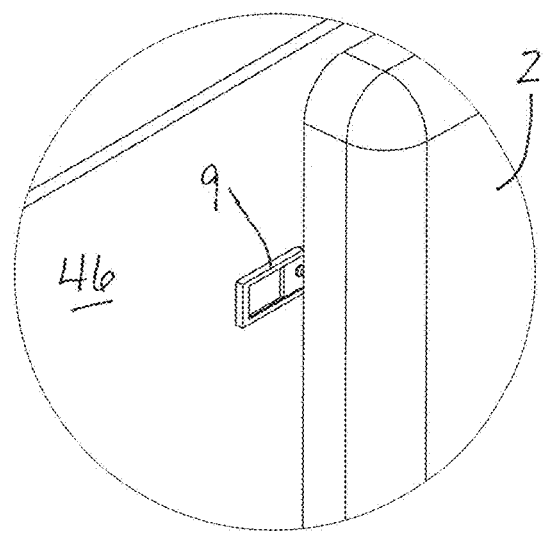
FIG. 13b is an isolated view on an enlarged scale taken from FIG. 1.
Figure 14:
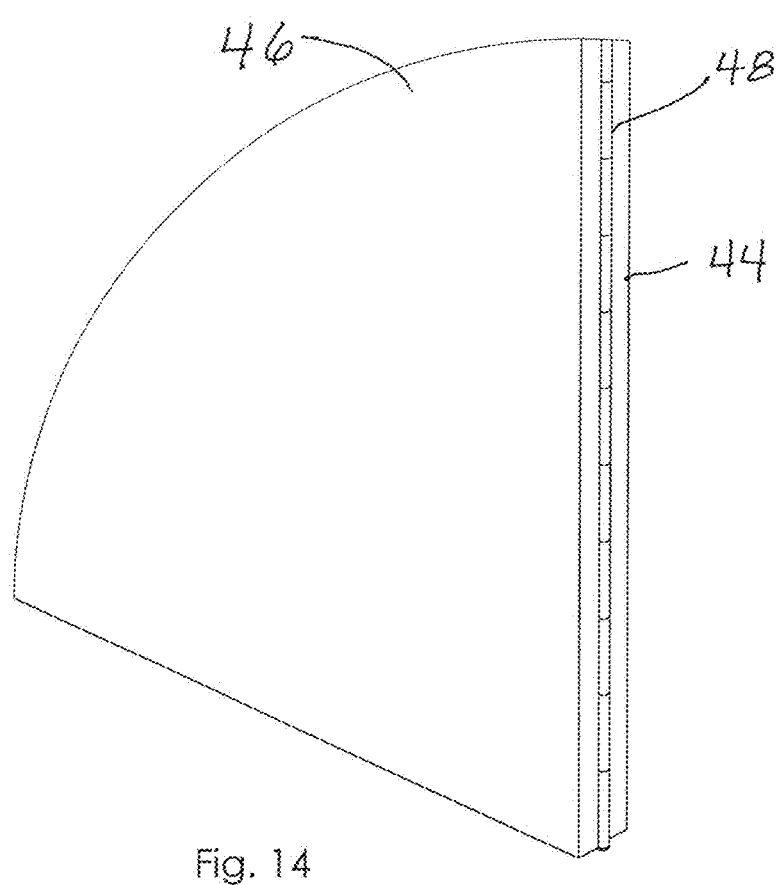
FIG. 14 is an isolated view on an enlarged scale taken from FIG. 3.

Modern pickup trucks include one of two types of fasteners adjacent the rear open end of the truck bed or pickup box. In one instance, a post 7 may extend inwardly from a side panel of the pickup box 2 (FIG. 13a). Accordingly, each side panel 46 may define an aperture 7a complementary to the post 7 for selective attachment thereto. In another instance, a D-ring fastener 8 may extend inwardly from a respective side panel (FIG. 13b). In this construction, each side panel 46 may include a slider 9 configured to selectively engage with the D-ring fastener 8 (FIG. 13b). In either configuration, the side panels 46 are releasably but securely coupled to the side panels of the truck bed itself.

In use, the truck bed extension apparatus 10 may be mounted to the inner surface 6 of a conventional truck primary tailgate 3, such as by bolting or screwing a portion of the hinge plate 22 of the hinge assembly 20 to the tailgate. With the auxiliary tailgate 40 at the stowed configuration, the primary tailgate 3 may be operated in a customary manner. However, if a user desires to extend the truck bed, the primary tailgate 3 is released to the open configuration and the auxiliary tailgate 40 is rotated to the upstanding/deployed configuration (FIG. 2). To enclose the now extended truck bed, the pair of side panels 46 may be pivotally moved to respective extended configurations and locked in as described above (FIG. 1).

As aspect of at least one of the inventions disclosed herein includes the realization that generic hinge assemblies can suffer from sagging of the auxiliary tailgate 40, relative to the primary tailgate 3 when in the stowed and closed position. For example, with reference to FIG. 15, when the primary tailgate 3 is in a closed position, such that the inner surface 6 of the primary tailgate 3 is generally vertical, the auxiliary tailgate 40 can sag downwardly.

Figure 15:
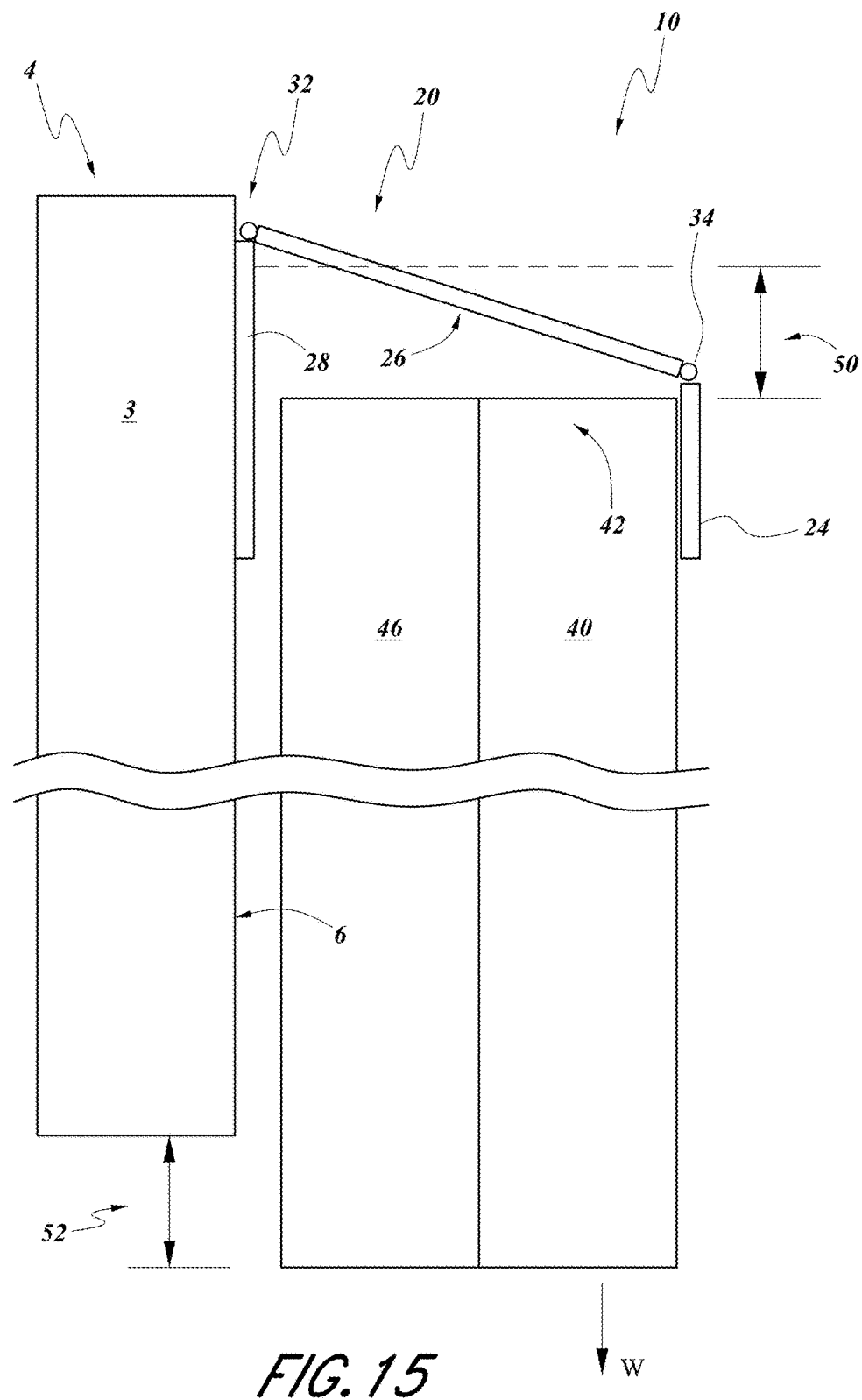
FIG. 15 is a schematic side elevational view of a the extension apparatus of FIG. 1, illustrating a sagging effect of the extension apparatus.

More specifically, with continued reference to FIG. 15, with the second plate section 28 of the hinge assembly 20 mounted to the inner surface 6 of the primary tailgate 3, the full weight of the auxiliary tailgate 40 and the side panels 46 are supported by the remaining portions of the hinge assembly 20. Namely, the full weight of the auxiliary tailgate 40 and the side panels 46 are supported by the front portion 24 of the hinge assembly 20, the first plate section 26, and the first and second hinges 32, 34. The weight W of the auxiliary tailgate 40 and the side panels 46 pulls downwardly on the hinge assembly 20. The weight W is transferred to the hinge assembly through the connection of the auxiliary tailgate 40 to the front portion 24 of the hinge assembly 20.

Illustrated in exaggerated scale in FIG. 15, the weight W pulls downwardly on the hinge assembly 20, causing the auxiliary tailgate 40 and side panels 46 to sag downwardly by a sag amount identified generally by the reference in numeral 50. The sag amount 50 represents a distance by which the auxiliary tailgate 40 is displaced downwardly from a position that would result if the first plate section 26 were normal to the second plate section 28. The sag amount 50 can cause the auxiliary tailgate 40 and side panels 46 to sag below a lower edge of the primary tailgate 3 by an amount 52. Sagging as such, auxiliary tailgate 40 and side panels 46 can interfere with the closing of the primary tailgate 3, by sagging into an area between the lower edge of the primary tailgate 3 and rear edge of a pickup bed. In order to avoid such interference, the auxiliary tailgate 40 and side panels 46 can be made shorter such that when sagging, in the orientation illustrated in FIG. 15, they do not interfere with the closing of the primary tailgate 3.

Shortening the auxiliary tailgate 40 and/or the side panels 46 can be undesirable. For example, such shortening of the auxiliary tailgate 40 and the side panels 46 will reduce the enclosed volume created by the auxiliary tailgate 40 and the side panels 46 when in the deployed position, with the primary tailgate 3 in an open position. This can also alter the overall aerodynamics of the vehicle to which the extension apparatus 10 is installed.

An aspect of at least one of the inventions disclosed herein includes the realization that modifying the hinge assembly 20 so as to limit the range of movement of the first plate section 26 relative to the second plate section 28 about the first hinge 32 can prevent the sagging illustrated in FIG. 15.

Figure 16:
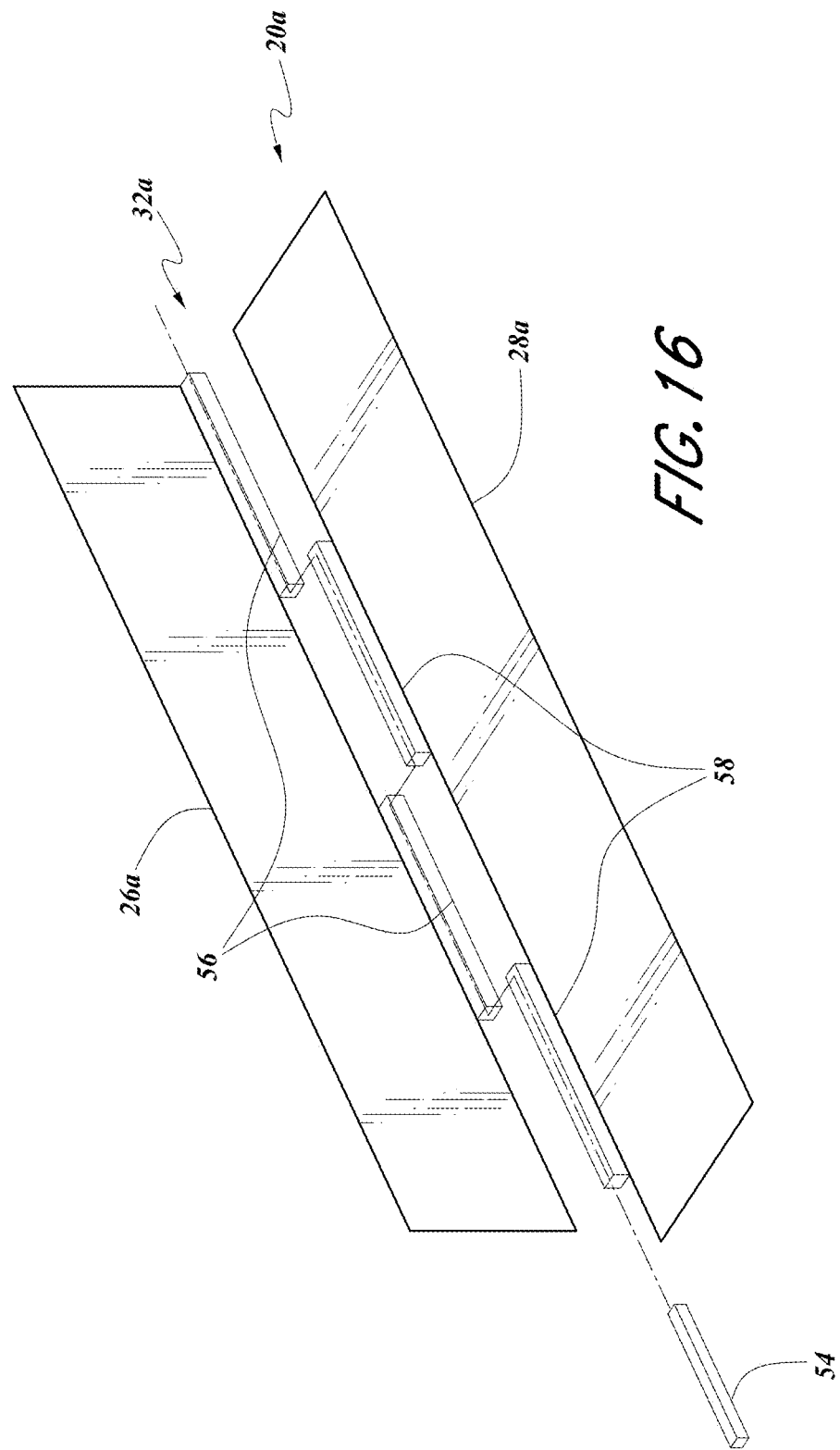
FIG. 16 is an exploded view of a modification of a portion of the extension apparatus of FIG. 1.
Figure 17:
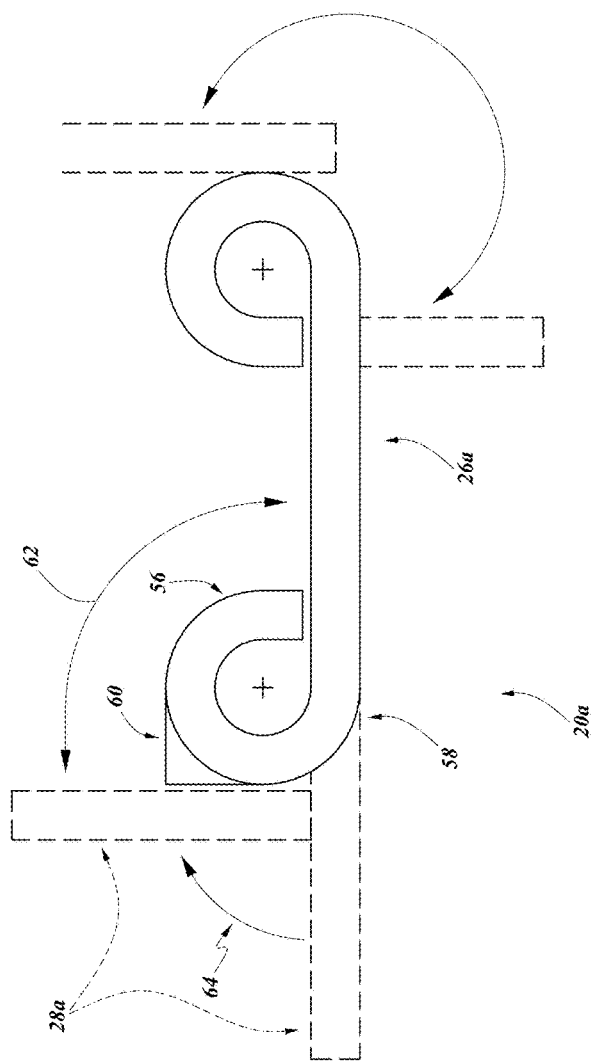
FIG. 17 is an enlarged schematic, side elevational view of the hinge of FIG. 16.

FIGS. 16 and 17 illustrate embodiments of a modification of the hinge assembly 20, identified generally by the reference numeral 20A. Parts, components, features and advantages of the hinge assembly 20A that are the same or similar to the corresponding parts, components, features or advantages of the hinge assembly 20 are referred to using the same reference numerals except that a letter "A" is added thereto.

With continued reference to FIG. 16, a portion of the hinge assembly 20A is illustrated therein, including first plate section 26A, second hinge plate section 28A and first hinge 32A.

The first hinge 32A includes a hinge pin 54 and a plurality of knuckles. For example, a plurality of first knuckles 56 can be attached to the first plate section 26A and a plurality of second knuckles 58 can be attached to the second plate section 28A. The knuckles 56 are spaced apart from each other along an inner edge of the first plate section 26A. Similarly, the second knuckles 58 are also spaced apart from one another along an inner edge of the second plate section 28A.

The knuckles 56, 58 are arranged such that they interleave with one another so as to form a continuous cylindrical passage into which the pin 54 is inserted. With the knuckles 56, 58 moved into alignment such that they are interleaved with one another, and with the pin 54 inserted through the cylindrical passage formed by the aligned knuckles 56, 58, the hinge 32A connects the first and second plate sections 26A, 28A such that they can pivot relative to one another about the hinge pin 54. This type of construction and functionality of a hinge is well known in the art.

In some embodiments, the hinge assembly 20A can be configured to limit movement of the first and second plate sections 26A, 28A such that they cannot be moved pivoted to an angle less than 90 degrees, in at least one orientation.

For example, the knuckles 56, 58 can be arranged and spaced from each other such that they interfere with the movements of the plate sections 26A, 28A. Optionally, in some embodiments, the hinge assembly 20A can include physical stops in one or more locations configured to limit the movement of the first and second plate sections 26A, 26B.

With reference to FIG. 17, the hinge assembly 20A can include one or more physical stops 60 configured to limit movement of the hinge plate 28A relative to the hinge plate section 26A. For example, the physical stop 60 can limit the movement of the first and second hinge plate sections 26A, 28A to an angle 62 of approximately 90 degrees, for example, an angle 62 in the range of about 86 degrees to 94 degrees. The physical stop 60 can be a separate piece mounted to either or both of the knuckles 56, 58 or can be formed integrally or monolithically with one or more of the knuckles 56, 58.

In the illustrated embodiment, the physical stop 60 is attached to knuckle 56. When the second hinge plate section 28A is moved in the direction of the closing direction 64, an inner surface of the second hinge plate section 28A contacts the physical stop 60, and thereby limits the pivotal movement of the second hinge plate section 28 relative to the first hinge plate section 26A to the angle 62. The positioning of the physical stop 60 can be chosen so as to provide the desired limitation on the pivoting movement described above. Other angles can also be chosen. For example, the physical stop 60 can be placed so as to limit the angle 62 to an angle so it would be greater than 90 degrees, so as to accommodate potential bending of portions of the hinge assembly 20A and thus prevent undesirable sagging that could result from such bending.

Figure 18:
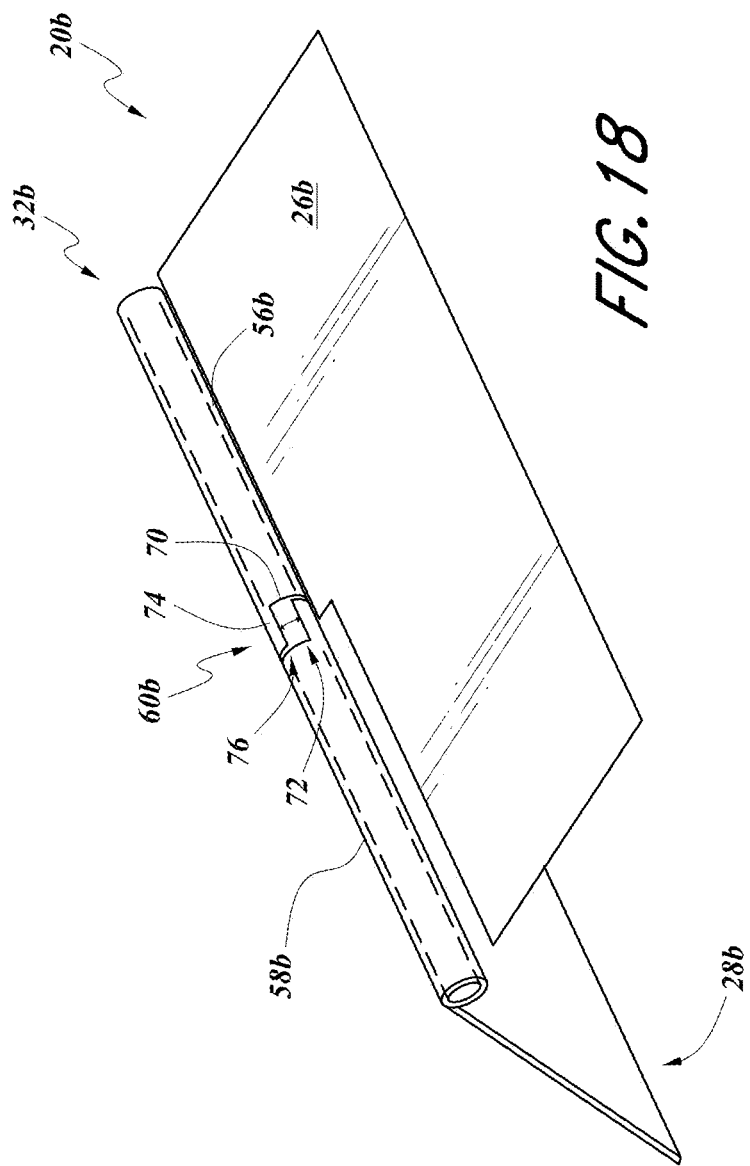
FIG. 18 is a perspective schematic view of yet another modification of a portion of the extension apparatus of FIG. 1.

FIG. 18 illustrates a further modification of the hinge assembly 20 identified generally by the reference numeral 20B. Parts, components, features and advantages of the hinge assembly 20B that are similar or the same as hinge assemblies 20 or 20A are identified with the same reference numeral, except that a letter "B" has been added thereto.

With reference to FIG. 18, the hinge assembly 20B is illustrated with only small portions of first and second hinge plate sections 26B, 28B and each having a single knuckle 56B, 58B. However, it is to be understood that the hinge plate sections 26B, 28B could have any length and include any number of knuckles 56B, 58B.

The hinge assembly 20B includes a physical stop 60B incorporated into juxtaposed ends of the knuckles 56B, 58B.

For example, the knuckle 56B, being directly attached or formed as an integrated portion of the hinge plate section 26B, can include an end surface 70. The end surface can include a projection or recess configured to cooperate with end surface 72 of knuckle 58B.

For example, the end surface 70 can include projection 74 having a predetermined width. The width of the projection 74 can extend around the cylindrical passage defined by the knuckle 56B a predetermined amount. Similarly, end surface 72 of the knuckle 58B can include a recess 76 configured to be interleaved with projection 74. Additionally, the recess 76 can extend around the cylindrical passage defined by the knuckle 58B a predetermined amount. The sizes of the projections 74 and the recess 76 can be configured to provide a limited range of movement of the hinge assembly B and in particular, range of pivoting movement of the hinge plate sections 26B, 28B, relative to one another. When moved in a pivoting motion, the projection and recess interfere with each other, and thereby limit the range of motion of the hinge plate sections 26B, 28B. In some embodiments, the physical stop assembly 60B can be configured to provide the same limits on range of motion described above with reference to FIG. 17 and the hinge assembly 20A.

Figure 19:
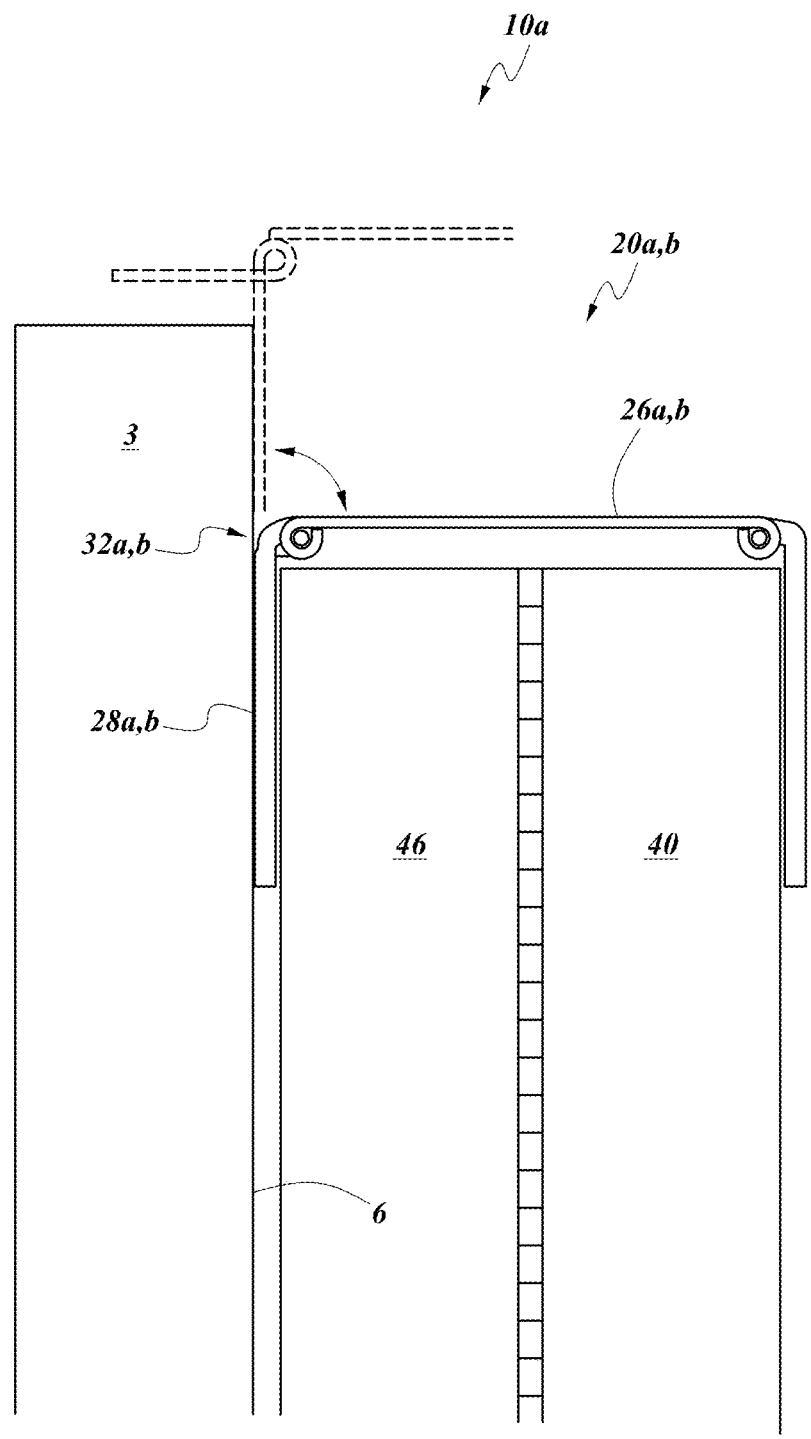
FIG. 19 is a schematic side elevational view of the hinge of FIG. 16 and showing three different positions of the extension apparatus.

With reference to FIG. 19, the extension apparatus 10A can include any of the above-described embodiments of the hinge assembly 20A, 20B. As such, when the auxiliary tailgate 40 and side panels 46 are in the stowed position, with the primary tailgate 3 in a closed position, in which its inner surface 6 is generally vertical, the hinge 32A or 32B limits the movement of the first hinge plate section 26A, B to a position roughly normal to the second hinge plate section 28A, B. As such, the sagging described above with regards to FIG. 15 is better prevented. Additionally, auxiliary tailgate 40 can be moved to a deployed position in which the first hinge plate section 26A, B is pivoted upwardly (as viewed in FIG. 19) with the auxiliary tailgate extending generally normal to the inner surface 6 of the primary tailgate 3. Additionally, the auxiliary tailgate 40 can then be pivoted to a release position approximately 180 degrees from the deployed position, as described above with reference to FIGS. 7-8.

It is understood that while certain forms of this invention have been illustrated and described, it is not limited thereto except insofar as such limitations are included in the following claims and allowable functional equivalents thereof.

What is claimed is:

1. A truck bed extension apparatus for use in extending a usable area of a truck having a pickup box that defines an open end and that includes a primary tailgate pivotally movable between a closed configuration impeding the open end and an open configuration not impeding the open end, said bed extension apparatus comprising:
   a hinge assembly that includes a first hinge plate coupled to the primary tailgate, a second hinge plate pivotally connected to the first hinge plate with a first hinge mechanism, and a third hinge plate connected to the second hinge plate with a second hinge mechanism;
   an auxiliary tailgate supported by the third hinge plate for pivotal movement about the first and second hinge mechanisms and a pair of side panels, wherein the pickup box is extended and enclosed when the primary tailgate is at the open configuration, said auxiliary tailgate is at said deployed configuration, and said pair of side panels is at an extended configuration; and
   at least one physical stop mounted to the hinge assembly and configured to define a first limit of a relative movement of the first and second hinge plates to an angle no less than about 90 degrees.

2. The truck bed extension apparatus as in claim 1, wherein the pair of side panels are pivotally coupled to side edges of said auxiliary tailgate, respectively, each side panel being selectively movable between a retracted configuration generally co-planar with and bearing against an inside surface of said auxiliary tailgate and an extended configuration generally perpendicular to said inside surface of said auxiliary tailgate.

3. The truck bed extension apparatus as in claim 1, wherein said auxiliary tailgate is pivotally movable to a released configuration generally perpendicular to the front edge of the first hinge plate and situated in a direction opposite a direction when at said deployed configuration.

4. The truck bed extension apparatus as in claim 1, wherein the physical stop is permanently mounted to a knuckle of at least one of the first and second hinge plates.

5. The truck bed extension apparatus as in claim 1, wherein the physical stop is integrally formed with a knuckle of at least one of the first and second hinge plates.

6. The truck bed extension apparatus as in claim 1, wherein the first hinge plate comprises a first knuckle and the second hinge plate comprises a second knuckle, the first and second knuckles being aligned with each other, and a hinge pin extends through both the first and second knuckles.

7. The truck bed extension apparatus as in claim 6, wherein the physical stop comprises at least one of the first and second knuckles.

8. The truck bed extension apparatus as in claim 6, wherein the physical stop comprises a projection on one of the first knuckle and second knuckles and a recess on the other of the first and second knuckles, wherein the projection and recess interact to limit a range of motion of the first hinge plate relative to the second hinge plate.

9. The truck bed extension apparatus as in claim 1, wherein the physical stop define the first limit of a relative movement of the first and second hinge plates to an angle no less than about 90 degrees when the auxiliary tailgate is folded about the hinge assembly into a stowed position.

10. A truck bed extension apparatus for use in extending a usable area of a truck having a pickup box that defines an open end and that includes a primary tailgate pivotally movable between a closed configuration impeding the open end and an open configuration not impeding the open end, said bed extension apparatus comprising:
a hinge assembly that includes a first hinge plate configured to be coupled to a primary tailgate of a pickup box, a second hinge plate pivotally connected to the first hinge plate with a first hinge mechanism and a third hinge plate connected to the second hinge plate with a second hinge mechanism;
an auxiliary tailgate connected to the third hinge plate for pivotal movement about the first and second hinge mechanisms and a pair of side panels, the auxiliary tailgate being configured to wherein the pickup box is extended and enclosed when the primary tailgate is at the open configuration, said auxiliary tailgate is at said deployed configuration, and said pair of side panels is at an extended configuration; and
at least one physical stop mounted to the hinge assembly and configured to define a first limit of a relative movement of the first and second hinge plates to an angle no less than about 90 degrees.

11. The truck bed extension apparatus as in claim 10, wherein the pair of side panels are pivotally coupled to side edges of said auxiliary tailgate, respectively, each side panel being selectively movable between a retracted configuration generally co-planar with and bearing against an inside surface of said auxiliary tailgate and an extended configuration generally perpendicular to said inside surface of said auxiliary tailgate.

12. The truck bed extension apparatus as in claim 10, wherein said auxiliary tailgate is pivotally movable to a released configuration generally perpendicular to the front edge of the first hinge plate and situated in a direction opposite a direction when at said deployed configuration.

13. The truck bed extension apparatus as in claim 10, wherein the physical stop is permanently mounted to a knuckle of at least one of the first and second hinge plates.

14. The truck bed extension apparatus as in claim 10, wherein the physical stop is integrally formed with a knuckle of at least one of the first and second hinge plates.

15. The truck bed extension apparatus as in claim 10, wherein the first hinge plate comprises a first knuckle and the second hinge plate comprises a second knuckle, the first and second knuckles being aligned with each other, and a hinge pin extends through both the first and second knuckles.

16. The truck bed extension apparatus as in claim 15, wherein the physical stop comprises at least one of the first and second knuckles.

17. The truck bed extension apparatus as in claim 15, wherein the physical stop comprises a projection on one of the first knuckle and second knuckles and a recess on the other of the first and second knuckles, wherein the projection and recess interact to limit a range of motion of the first hinge plate relative to the second hinge plate.

18. The truck bed extension apparatus as in claim 10, wherein the physical stop define the first limit of a relative movement of the first and second hinge plates to an angle no less than about 90 degrees when the auxiliary tailgate is folded about the hinge assembly into a stowed position.

19. A truck bed extension apparatus for use in extending a usable area of a truck having a pickup box that defines an open end and that includes a primary tailgate pivotally movable between a closed configuration impeding the open end and an open configuration not impeding the open end, said bed extension apparatus comprising:
a hinge assembly that includes a first hinge plate coupled to the primary tailgate, a second hinge plate pivotally connected to the first hinge plate with a first hinge mechanism, and a third hinge plate connected to the second hinge plate with a second hinge mechanism;
an auxiliary tailgate supported by the third hinge plate for pivotal movement about the first and second hinge mechanisms and a pair of side panels, wherein the pickup box is extended and enclosed when the primary tailgate is at the open configuration, said auxiliary tailgate is at said deployed configuration, and said pair of side panels is at an extended configuration; and
means for limiting a relative movement of the first and second hinge plates to an angle no less than about 90 degrees.

* * * * *